US012650400B2

(12) United States Patent
Zhang et al.

(10) Patent No.: US 12,650,400 B2
(45) Date of Patent: Jun. 9, 2026

(54) BIOSENSOR

(71) Applicant: LEADWAY (HK) LIMITED, Sheung Wan (CN)

(72) Inventors: Yu Zhang, Hangzhou (CN); Jing Li, Hangzhou (CN); Xiaoxu Zeng, Hangzhou (CN); Li Zhang, Hangzhou (CN); Jun Sun, Hangzhou (CN)

(73) Assignee: LEADWAY (HK) LIMITED, Sheung Wan (CN)

( * ) Notice: Subject to any disclaimer, the term of this patent is extended or adjusted under 35 U.S.C. 154(b) by 364 days.

(21) Appl. No.: 18/036,134

(22) PCT Filed: Nov. 10, 2021

(86) PCT No.: PCT/CN2021/129841
§ 371 (c)(1),
(2) Date: May 9, 2023

(87) PCT Pub. No.: WO2022/100617
PCT Pub. Date: May 19, 2022

(65) Prior Publication Data
US 2024/0060928 A1 Feb. 22, 2024

(30) Foreign Application Priority Data

Nov. 11, 2020 (CN) .......................... 202022592830.1

(51) Int. Cl.
*G01N 27/327* (2006.01)
*B01L 3/00* (2006.01)

(52) U.S. Cl.
CPC .... *G01N 27/3275* (2013.01); *B01L 3/502715* (2013.01); *B01L 2300/0645* (2013.01); *B01L 2300/0681* (2013.01)

(58) Field of Classification Search
CPC ............ G01N 27/3272; G01N 27/3275; B01L 3/502715; B01L 2300/0645; B01L 2300/0681
See application file for complete search history.

(56) References Cited

U.S. PATENT DOCUMENTS 5,582,697 A 12/1996 Ikeda et al.
2002/0053523 A1* 5/2002 Liamos .............. G01N 27/3272
204/403.03

(Continued)

FOREIGN PATENT DOCUMENTS

CN 1461410 A 12/2003
CN 1527938 A 9/2004

(Continued)

OTHER PUBLICATIONS

International Search Report issued in PCT/CN2021/129841 dated Dec. 22, 2021—incl Engl lang transl (4 pages total).

(Continued)

*Primary Examiner* — Gurpreet Kaur
(74) *Attorney, Agent, or Firm* — Michael A. Whittaker

(57) ABSTRACT

The present invention relates to a biosensor capable of determining whether the sample addition amount is sufficient. The biosensor at least comprises an insulating substrate, a working electrode and a fill detection electrode. The fill detection electrode is further away from the sample supply port of the biosensor than the working electrode, and the fill detection electrode is not in contact with a sample supply channel. The biosensor of the present invention can determine whether the sample amount added to the biosensor meets detection requirements, which effectively avoids the risk of insufficient sample amount and ensures the accuracy of test results.

13 Claims, 8 Drawing Sheets

(56)            References Cited

U.S. PATENT DOCUMENTS

| | | | |
|---|---|---|---|
| 2011/0186428 A1 | 8/2011 | Beaty et al. | |
| 2014/0178909 A1* | 6/2014 | Tonks ...................... | C12Q 1/32 |
| | | | 435/14 |
| 2017/0121754 A1 | 5/2017 | Feldman et al. | |

FOREIGN PATENT DOCUMENTS

| | | |
|---|---|---|
| CN | 106226379 A | 12/2016 |
| CN | 107121478 A | 9/2017 |
| WO | 2022100617 A1 | 5/2022 |

OTHER PUBLICATIONS

International Preliminary Report on Patentability issued in PCT/CN2021/129841 dated May 16, 2023—incl Engl lang transl (11 pages total).
Extended European Search Report issued in EP 21891137.8 dated Sep. 10, 2024 (8 pages).

\* cited by examiner a               b               c               d

BIOSENSOR

CROSS-REFERENCE TO RELATED APPLICATIONS

The present invention is filed under 35 U.S.C. § 371 as the U.S. national phase of International Application No. PCT/CN2021/129841, filed Nov. 10, 2021, which designated the United States and claims the benefit of priority of Chinese Patent Application No. 202022592830.1 filed Nov. 11, 2020, the contents of each of which are being hereby incorporated by reference in their entirety for all purposes.

FIELD OF THE INVENTION

The present invention relates to the field of detection, in particular to a biosensor for detection.

BACKGROUND OF THE INVENTION

A biosensor can generally measure an analyte in a biological sample such as blood, urine or saliva, and use a test instrument to convert an electrical signal measured by the biosensor into the content of the analyte in the biological sample. Biosensors are now widely used in hospitals or homes to detect analytes such as blood glucose, cholesterol, uric acid, triglyceride, lactate, ketone bodies, enzymes, creatinine, or urea in biological samples.

A biosensor generally includes an insulating substrate, and a working electrode and a counter electrode which are constructed on the insulating substrate. The working electrode and the counter electrode may be referred to as an electrode system. A reagent solution layer covers the electrode system, the solution layer is covered with a hydrophilic film layer, and a cover plate with an air hole is adhered to the hydrophilic film layer. A sample supply channel is formed between the hydrophilic film layer and the insulating substrate, and the working electrode and the counter electrode are arranged in the sample supply channel. After a sample supply port contacts a body fluid sample to be detected, the sample automatically enters the sample supply channel by capillary-siphon action and reaches the working electrode and the counter electrode through the sample supply port. The sample reacts with the reagent in the reagent solution layer, and the content of an analyte, such as the content of glucose, is detected through the electrode system and a test instrument connected with the electrode system.

It generally has certain requirements for the sample amount added to the biosensor. If the amount of the added sample is insufficient and relevant electrodes are not completely covered, the detection result is inaccurate. If the test instrument is unable to determine that the sample addition amount is insufficient and the test instrument is allowed to proceed with data acquisition and conversion, the test instrument will give incorrect detection results.

In order to overcome the aforesaid shortcomings, researchers add a third electrode to the original electrode system for determining whether the sample addition amount is sufficient. The third electrode is positioned further away from the sample supply port than the working electrode and the counter electrode, and both ends of the third electrode are in contact with both sides of the sample supply channel of the biosensor. A method for determining whether the sample addition amount is sufficient by using the third electrode is as follows: when a sample reaches the third electrode, the test instrument measures an electric signal that the third electrode forms a circuit with another electrode;

and if said electrical signal is within the range of set values, it indicates that the sample already completely covers the working electrode and the counter electrode, and the test instrument continues the detection procedure and gives a detection result. If the test instrument does not measure an electric signal between the third electrode and another electrode, or said electrical signal is not within the range of set values, it indicates that the sample does not completely cover the working electrode and the counter electrode, and the test instrument stops detection and gives a warning message that the sample addition amount is insufficient.

Providing the third electrode on the biosensor indeed can determine to a large extent whether the sample addition amount is sufficient. However, because the edges of both sides of the sample supply channel are made of hydrophilic materials, it sometimes results in that the forefront liquid surface of the sample in the sample supply channel will be in a concave liquid surface shape, and especially when the sample supply channel is relatively wide, the foremost end of both sides of the concave liquid surface touches the third electrode first, while the tail end in the middle of the concave liquid surface does not cover all over the working electrode. As the foremost ends of both sides of the concave liquid surface already touch the third electrode, a circuit is formed between the third electrode and the other electrode paired therewith, and the test instrument monitors the change of the electrical signal of this circuit, and then gives an incorrect determination that the sample amount is sufficient, resulting in an inaccurate detection result. When both sides of the sample supply channel are made of hydrophilic materials and the channel is relatively wide, a concave liquid surface will be formed at the front end of the liquid surface in the sample supply channel sometimes. If the sample amount is insufficient, the working electrode and the counter electrode are not completely covered by the sample but both sides of the liquid surface of the sample can already contact the third electrode, so that the test instrument incorrectly determines that the sample addition amount is sufficient and obtains an inaccurate detection result.

SUMMARY OF THE INVENTION

The present invention aims to provide a high-performance biosensor that can identify sample insufficiency and ensure the accuracy of test results by studying the design and detection processes of detection electrodes. In order to achieve the objective of the present invention, the following technical solution is provided.

A biosensor comprises an insulating substrate, a sample supply channel, a working electrode and a fill detection electrode for determining whether the sample amount is sufficient, and a reagent layer covering at least the working electrode; the fill detection electrode is further away from the sample supply port of the sample supply channel than the working electrode; and a gap is formed between the ends of both sides of the head of the fill detection electrode close to the sample supply port and the inner side wall of the sample supply channel.

Specifically, setting of the gap between the fill detection electrode and the inner side wall of the sample supply channel may include, but is not limited to, the following ways:

For example, a gap is formed between the ends of both sides of the head of the fill detection electrode close to the sample supply port and the inner side wall of the sample supply channel, and the ends of both sides of the tail of the fill detection electrode away from the sample supply port are in contact with the inner side wall of the sample supply channel. Alternatively, for example, the whole fill detection electrode is not in contact with the inner side wall of the sample supply channel anywhere.

Said biosensor further comprises a counter electrode. The fill detection electrode is further away from the sample supply port of the sample supply channel than the working electrode and the counter electrode. The working electrode is closest to the sample supply port, and the counter electrode is disposed between the working electrode and the fill detection electrode. Alternatively, the counter electrode is closest to the sample supply port, and the working electrode is disposed between the counter electrode and the fill detection electrode. In the biosensor with no counter electrode, said fill detection electrode also functions as the counter electrode.

The distance of said gap meets that: in the case where the added sample amount is the sample addition amount required by said biosensor, the working electrode in the sample supply channel is already completely covered by the sample when the sample contacts the fill detection electrode. In a preferred solution, the distance of said gap meets that: in the case where the added sample amount is the sample addition amount required by said biosensor, the working electrode and the counter electrode in the sample supply channel are already completely covered by the sample when the sample comes contacts the fill detection electrode.

In a specific solution, the width of the sample supply channel ranges from 2 mm to 4 mm, and the width of the fill detection electrode ranges from 1 mm to 1.8 mm.

The distance between the fill detection electrode and the working electrode or counter electrode closest to the same is 0.1 mm to 2.5 mm.

Said biosensor further comprises an insulating layer and a cover layer, the cover layer is provided with a vent hole, and an interlayer is disposed between the insulating layer and the cover layer.

Said biosensor can be used to detect uric acid, blood glucose, cholesterol, lipoproteins, hemoglobin, creatinine or urea in biological samples.

A method of determining whether a sample addition amount is sufficient using biosensing, comprises providing a biosensor as described in the present invention. An electrical signal of an electrical circuit associated with the fill detection electrode is obtained; if said electrical signal is within the range of set values, it indicates that the sample already completely covers the working electrode and the counter electrode; and if the test instrument does not measure an electric signal between the third electrode and another electrode, or said electrical signal is not within the range of set values, it indicates that the sample does not completely cover the working electrode and the counter electrode. Said electrical signal is selected from current, resistance or potential.

In a preferred instance, a method of determining whether a sample addition amount is sufficient using biosensing, comprises providing a biosensor as described in the present invention. An electrical signal of an electrical circuit associated with the fill detection electrode is obtained; if the obtained current signal is greater than a set value within a specified time, it determines that the sample addition amount is sufficient; and if the obtained current signal is not greater than a set value within a specified time, it determines that the sample addition amount is insufficient. Said electrical signal is current.

Said associated electric circuit is an electric circuit formed between the working electrode and the fill detection electrode. Alternatively, said associated electric circuit is an electric circuit formed between the counter electrode and the fill detection electrode.

A method for detecting the content of an analyte in a sample using a biosensor, comprises the following steps:

(1) providing the biosensor described in the present invention;

(2) connecting the biosensor to a test instrument;

(3) adding a sample to a sample supply port of the biosensor;

(4) applying a DC voltage or an AC voltage with small amplitude between the working electrode and the counter electrode to obtain an electrical signal 1;

(5) applying a DC voltage or an AC voltage with small amplitude between the working electrode and the fill detection electrode to obtain an electrical signal 2;

(6) if the obtained electrical signal 2 is greater than a set value within a specified time, determining that the sample addition amount is sufficient; and if the obtained electrical signal 2 is not greater than a set value within a specified time, determining that the sample addition amount is insufficient; and (7) if the sample addition amount is sufficient, the test instrument obtains the test result of the analyte according to the electrical signal 1; and if the sample addition amount is insufficient, the test instrument gives an error message that the sample addition amount is insufficient, and the detection ends.

As for step (6), it can also be that if the obtained electrical signal 2 is within the range of set values within the specified time, determining that the sample addition amount is sufficient, and if the electrical signal 2 cannot be measured or the obtained electrical signal 2 is not within the range of set values within the specified time, determining that the sample addition amount is insufficient.

Said electrical signal is selected from current, resistance or potential.

A method of manufacturing a biosensor, comprises the following steps:

(1) forming an electrode system and electrode wires on an insulating substrate;

(2) adding a reaction reagent to the electrode system;

(3) covering the electrode system with an interlayer, with part of the electrode system exposed in a groove in the interlayer; and (4) providing a cover layer on the interlayer.

The electrode system of the manufactured biosensor comprises a working electrode and a fill detection electrode, or a working electrode, a counter electrode and a fill detection electrode. Said fill detection electrode is further away from the sample supply port of the sample supply channel than the working electrode and the counter electrode, and a gap is formed between the ends of both sides of the head of said fill detection electrode close to the sample supply port and the inner side wall of the sample supply channel. Still further, the ends of both sides of the tail of the fill detection electrode away from the sample supply port are in contact with the inner side wall of the sample supply channel, or the fill detection electrode is not in contact with the inner side wall of the sample supply channel anywhere.

At least the electrode part of the fill detection electrode of the present invention close to the sample supply port is not in contact with the inner side wall of the sample supply channel, i.e., a certain spacer area or gap is reserved between the fill detection electrode and the inner side wall of the channel. When a concave liquid surface shape appears at the front edge of the liquid surface in the sample supply channel, in the case where the sample does not completely cover the working electrode and the counter electrode, the liquid sample will not contact the fill detection electrode even if the front ends of both sides of the concave liquid surface reach the spacer area between the fill detection electrode and the inner side of the channel, so that the test instrument can accurately determines the situation that the sample addition amount is insufficient. This improves the accuracy of determining whether the sample addition amount is sufficient when a concave liquid surface appears in a sample supply channel. This not only ensures the accuracy of detection results, but also can meet the requirements of micro blood collection, save test sample amounts and reduce patients' pain.

DETAILED DESCRIPTION OF THE EMBODIMENTS

Figure 1:
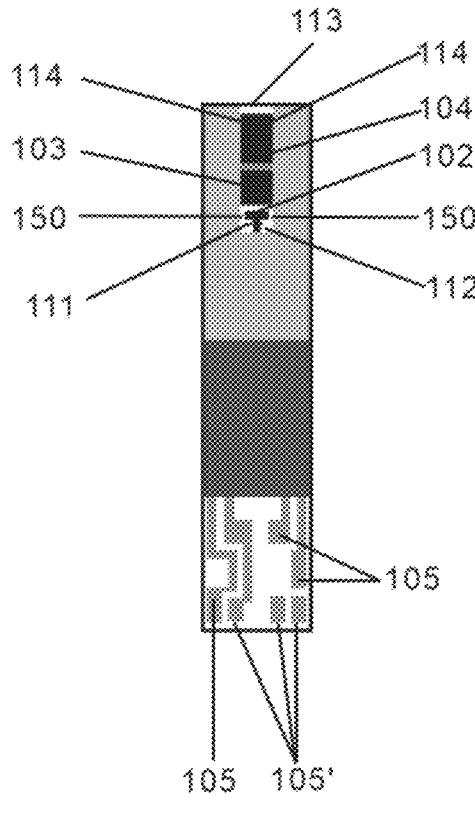
FIG. 1 is a biosensor described in the present invention.
Figure 2:
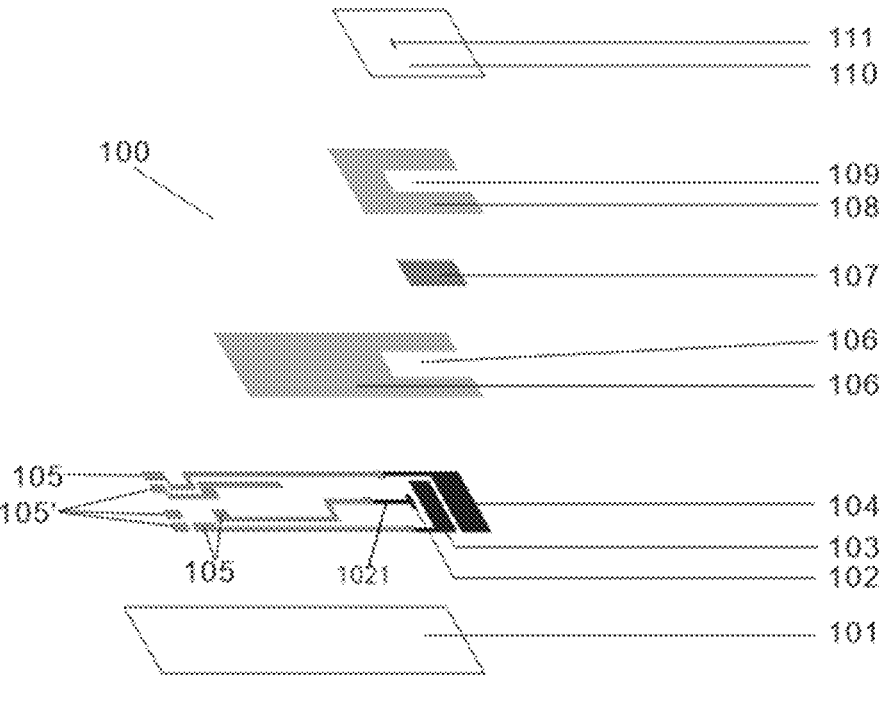
FIG. 2 is an exploded schematic diagram of the biosensor described in FIG. 1.

As shown in FIGS. 1 and 2, a biosensor of the present invention includes a working electrode 104, a counter electrode 103 and a fill detection electrode 102, which are disposed on an insulating substrate 101. The fill detection electrode 102 is further away from the sample supply port of the sample supply channel of the biosensor than the working electrode 104. The working electrode 104, the counter electrode 103 and the fill detection electrode 102 are arranged in sequence from the sample supply port 113 of the sample supply channel 112 to the distal end of the sample supply channel of the biosensor. The working electrode is closest to the sample supply port, the fill detection electrode is farthest from the sample supply port, and the counter electrode is disposed between the working electrode and the fill detection electrode. The fill detection electrode is used to determine whether the sample addition amount is sufficient, and whether the sample is sufficient refers to whether a sample added to the sensor meets the sample addition amount required by this sensor. The fill detection electrode is a linear electrode, and the ends of both sides of the line of the fill detection electrode 102 do not touch the two inner side walls 114 of the sample supply channel 112, or in other words, the positive projection of the fill detection electrode 102 on the insulating substrate does not contact or intersect with the two inner sides of the projection of the sample supply channel on the insulating substrate. As shown in FIG. 1, there's a certain spacing distance between the ends of both sides of the fill detection electrode and the two inner side walls of the sample supply channel, i.e., there is a gap 150 between the fill detection electrode and the two inner side walls of the sample supply channel, and the spacing distance or the gap is set such that: in the case where the added sample amount is the sample addition amount required by said biosensor, the working electrode and the counter electrode in the sample supply channel are already completely covered by the sample when the front edge of the sample in the sample supply channel contacts the fill detection electrode.

Figure 11:
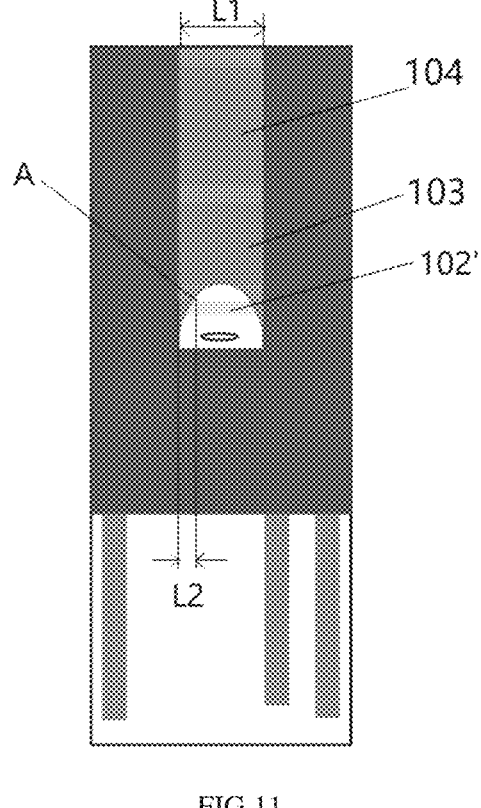
FIG. 11 illustrates L1 and L2 measurement positions on the biosensor.
Figure 12:
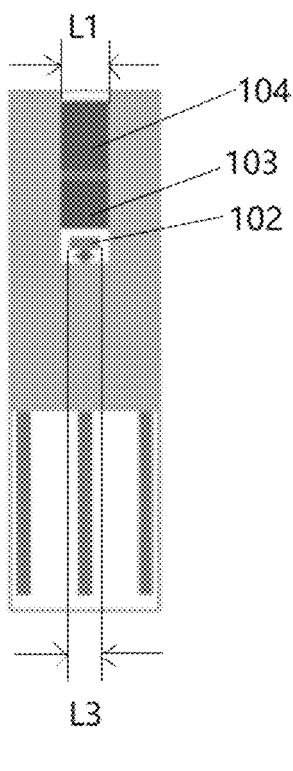
FIG. 12 illustrates an L3 measurement position on the biosensor.

A way of determining the width of the fill detection electrode and the gap distance is that the width of the fill detection electrode and the spacing distance between the fill detection electrode and the inner side walls of the sample supply channel are determined according to the width of the sample supply channel and the sample addition amount. For example, as shown in FIGS. 11 and 12, FIG. 11 shows a fill detection electrode 102' in the prior art, and the fill detection electrode 102' is in contact with the inner side wall of the sample supply channel; and FIG. 12 shows a fill detection electrode 102 of the present invention, and the fill detection electrode 102 is not in contact with the inner wall of the sample supply channel. L1 refers to the width between the two inner sides of the sample supply channel. Contact point A indicates the contact point where the sample with a concave liquid surface formed contacts the fill detection electrode 102' and is closest to the sample supply port 113 when the sample in the sample supply channel covers all over the working electrode and the counter electrode. L2 is the distance from the contact point A to the inner side of the sample supply channel when the sample in the sample supply channel covers all over the working electrode and the counter electrode. The width L3 of the fill detection electrode is obtained based on L1 and L2, and the formula for calculating L3 is shown in Formula I, for example. According to Formula I, the value of L2 can be used as the gap distance between the fill detection electrode and the inner side wall of the sample supply channel.

$$L3 = L1 - L2*2 \qquad \text{Formula I}$$

Considering that the shape of the concave liquid surface of the liquid sample in the channel is not necessarily consistent after sample addition every time, for example, the concave radian of the concave liquid surface is different in size, in a preferred solution, the spacing distance from the ends of both sides of the fill detection electrode to the inner side wall of the sample supply channel is appropriately enlarged on the basis of L2 when being set, for example, L2 is selected to be multiplied by a 1.5 times enlargement factor to obtain a safe distance (the safe distance is defined as follows: regardless of the size of the concave radian of the concave liquid surface, when the tail end of the concave liquid surface of the liquid sample in the channel covers all over the working electrode and the counter electrode, none of the two sides of the concave liquid surface touches the fill detection electrode, at which time the distance from the two ends of the fill detection electrode to the inner side wall of the sample supply channel is the safe distance). Different enlargement factors can be selected according to the requirements of different biosensors. Finally, according to the width of the sample supply channel and the safe distance, the width L3 of the fill detection electrode is obtained, and the formula for calculating L3 is shown in Formula II, for example. According to Formula II, the value of said safe distance can be used as the gap distance between the fill detection electrode and the inner side wall of the sample supply channel.

$$L3 = L1 - L2*1.5*2 \qquad \text{Formula II}$$

In a specific design, when the width L1 of the sample supply channel of the biosensor of the present invention is set to range from 2.0 to 4.0 mm, the value of L2 is measured after a corresponding amount of sample is added to the sample supply channel, and its corresponding width L3 of the fill detection electrode is calculated to be in the range of about 1.0 to 1.8 mm according to Formula II, with specific values being shown in the table below.

| Sample addition amount (μL) | Width L1 of sample supply channel (mm) | Distance L2 from contact point A to inner side of sample supply channel (mm) | Safe distance from two ends of fill detection electrode to inner side of sample supply channel (mm) | Width L3 of fill detection electrode (mm) |
|---|---|---|---|---|
| 2.4 | 2.0 | 0-0.2 | 0.3 | 1.4 |
| 2.9 | 2.4 | 0-0.2 | 0.3 | 1.8 |
| 3.7 | 3.0 | 0-0.4 | 0.6 | 1.8 |
| 4.3 | 3.5 | 0-0.8 | 1.2 | 1.1 |
| 4.9 | 4.0 | 0-1.0 | 1.5 | 1.0 |

Figure 3:
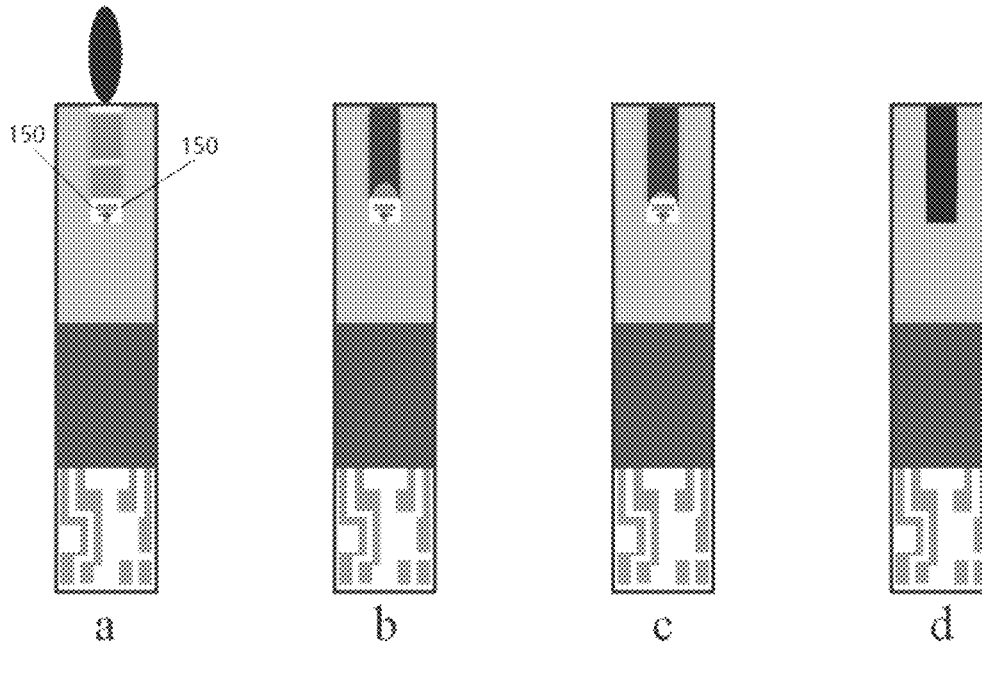
FIG. 3*a* is a schematic diagram of a biological sample added at the sample supply channel of the biosensor shown in FIG. 1 of the present invention.
FIG. 3*b* to FIG. 3*d* are situations that three different volumes of biological samples enter the sample supply channel of the biosensor shown in FIG. 1.
Figure 4:
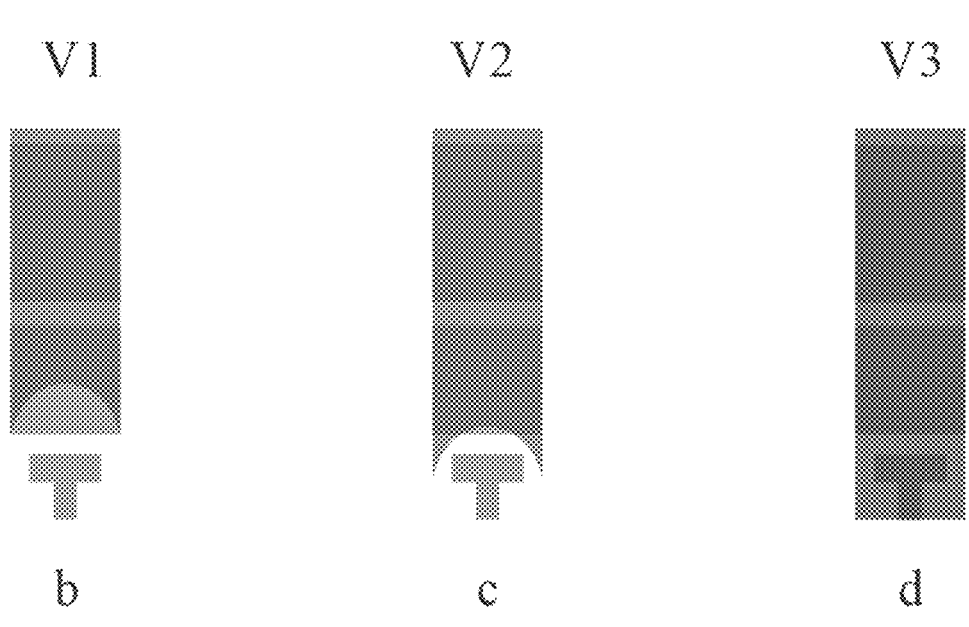
FIG. 4*b* to FIG. 4*d* are partial enlarged views of the sample supply channel in FIG. 3*b* to FIG. 3*d* respectively, showing how the sample in the sample supply channel covers the electrode.
Figure 5:
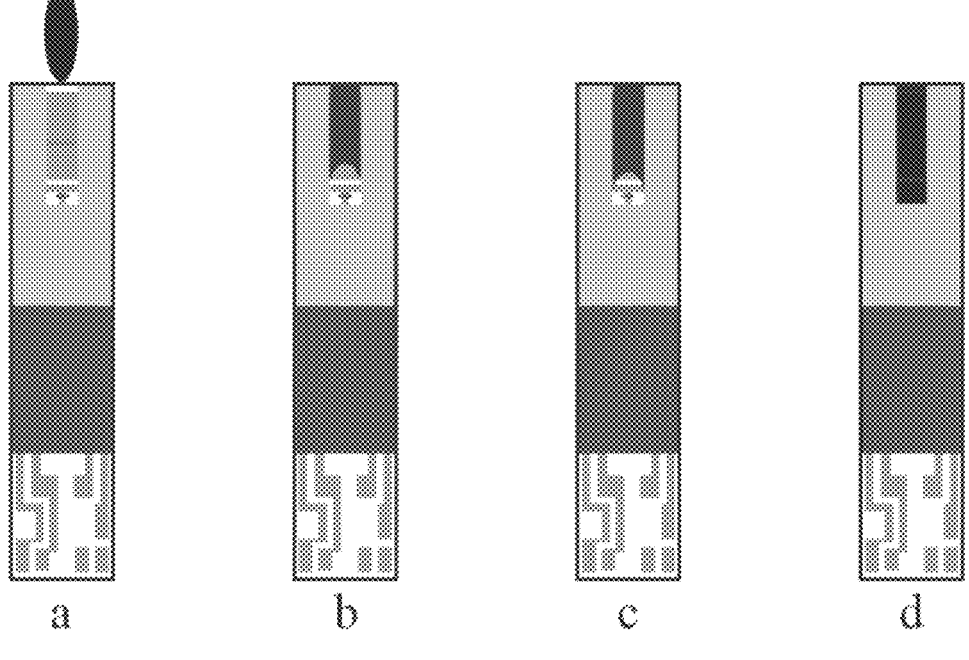
FIG. 5*a* is a schematic diagram of a biological sample added at the sample supply channel of the biosensor shown in FIG. 7.
FIG. 5*b* to FIG. 5*d* are situations that three different volumes of biological samples enter the sample supply channel of the biosensor described in FIG. 7.
Figure 6:
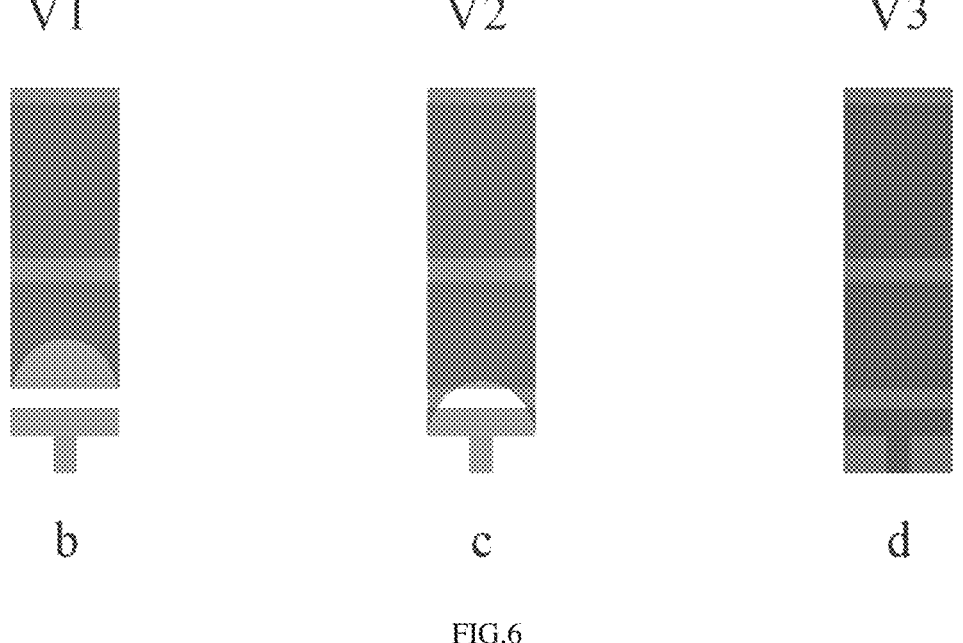
FIG. 6*b* to FIG. 6*d* are partial enlarged views of the sample supply channel in FIG. 5*b* to FIG. 5*d* respectively, showing how the sample in the sample supply channel covers the electrodes.

Three groups of sample volumes are set as V1, V2 and V3, where V1 indicates that the sample addition amount is much less than the sample addition amount required by the biosensor; V2 indicates that the sample addition amount is more than V1, but still does not reach the sample addition amount required by the biosensor; and V3 indicates that the sample addition amount reaches the sample addition amount required by the biosensor. In the manner of FIG. 3a and FIG. 5a, different volumes of samples are added from the sample supply port to the biosensor shown in FIG. 1 and FIG. 7, respectively.

Figure 7:
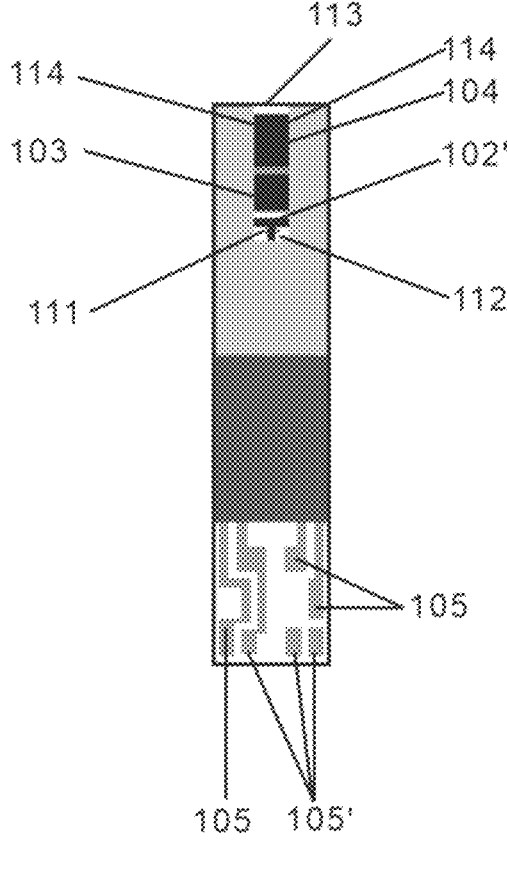
FIG. 7 is a biosensor with both sides of the three different volumes of biological samples electrode in contact with the inner side wall of the sample supply channel.
Figure 8:
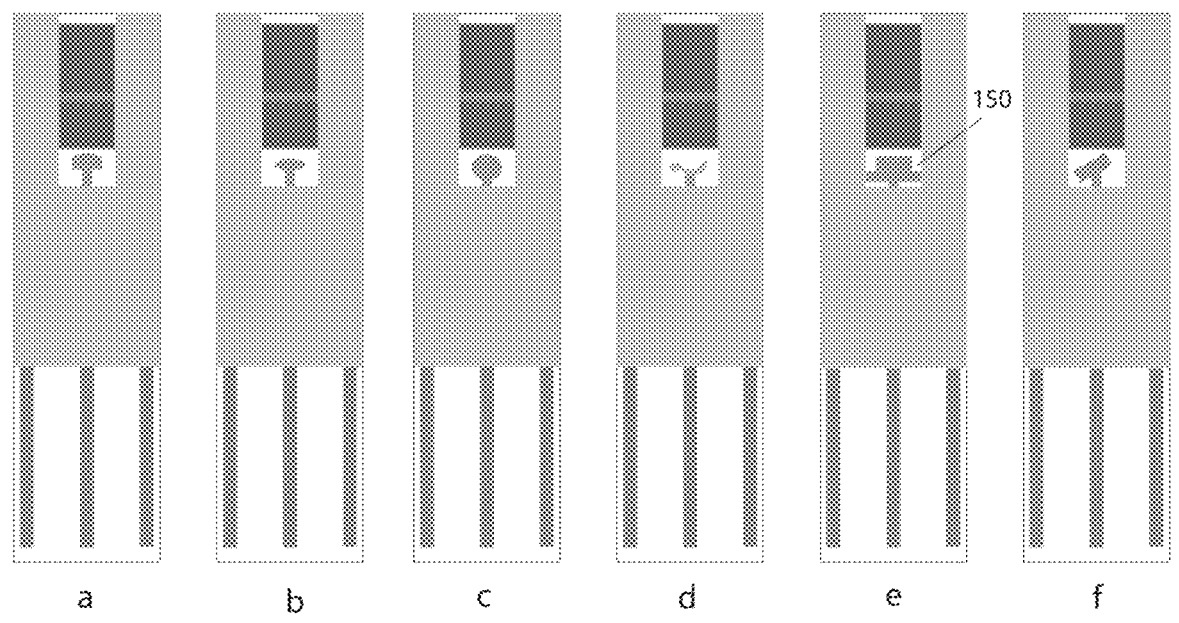
FIGS. 8*a* to 8*f* are biosensors of the present invention having fill detection electrodes of different shapes.

Samples of these three volumes V1, V2 and V3 are added to the sample supply channel of the biosensor shown in FIG. 1, respectively. FIGS. 3b and 4b, FIGS. 3c and 4c, and FIGS. 3d and 4d are how the electrode in the sample supply channel is covered by the sample after addition of different sample amounts, respectively. Samples of these three volumes V1, V2 and V3 are added to the sample supply channel of the biosensor shown in FIG. 7, respectively. FIGS. 5b and 6b, FIGS. 5c and 6c, and FIGS. 5d and 6d are situations that the electrode in the sample supply channel is covered after addition of different sample amounts, respectively. The structure of the biosensor shown in FIG. 7 is basically the same as that of the biosensor shown in FIG. 1, only except that the settings of the fill detection electrode of the two are different. The ends of both sides of the fill detection electrode 102 shown in FIG. 1 are not in contact with the two inner side walls of the sample supply channel, while the ends of both sides of the fill detection electrode 102' shown in FIG. 7 are in contact with the two inner side walls of the sample supply channel.

When the sample volume is V1, as shown in FIGS. 3b and 4b, and FIGS. 5b and 6b, none of the samples completely covers the counter electrode, and the sample does not contact the fill detection electrode either. In this case, the test instrument connected to the biosensor cannot detect the electrical signal of the electrical circuit associated with the fill detection electrode, and thus the test instrument gives the determination that the sample addition amount is insufficient, which is a correct determination in accordance with the actual situation. Said electrical signal of the electrical circuit associated with the fill detection electrode, is the electrical signal between the working electrode and the fill detection electrode, for example.

When the sample volume is V2, as shown in FIG. 3c and FIG. 4c, the area of the counter electrode covered by the sample is larger than the area covered when the sample addition amount is V1, but the sample still does not completely cover all over the counter electrode. Since the two ends of the fill detection electrode of the biosensor shown in FIG. 1 are not in contact with the two sides of the sample supply channel, the sample does not contact the fill detection electrode even though the front ends of both sides of the sample appearing as a concave liquid surface have reached the gap 150 (blank) area between the fill detection electrode and both sides of the sample supply channel. In this case, the test instrument does not obtain the electrical signal between the working electrode and the fill detection electrode, and gives the determination that the sample addition amount is insufficient, giving a correct determination the same as the actual sample addition situation. In contrast, as shown in FIG. 5c and FIG. 6c, the area of the counter electrode covered by the sample is larger than the area covered when the sample addition amount is V1, but the sample still does not completely cover all over the counter electrode. Since the two ends of the fill detection electrode of the biosensor shown in FIG. 7 are in contact with both sides of the sample supply channel, the front ends of both sides of the sample appearing as a concave liquid surface already reaches and contacts the fill detection electrode in the case where the sample does not completely cover all over the counter electrode. In this case, the test instrument obtains the electrical signal between the working electrode and the fill detection electrode, and gives an incorrect determination that the sample addition amount is sufficient, which is not in accordance with the actual situation.

When the sample volume is V3, as shown in FIGS. 3d and 4d, and FIGS. 5d and 6d, the sample completely covers all over the counter electrode and the working electrode, and the samples all contact the fill detection electrode. In this case, the test instrument obtains the electrical signal between the working electrode and the fill detection electrode and gives the determination that the sample addition amount is sufficient, which is a correct determination in accordance with the actual situation.

An uneven liquid front edge such as a concave liquid surface is formed at the front end of the sample in the sample supply channel of the biosensor sometimes, so the fill detection electrode set in the way of FIG. 1 can effectively reduce the probability that the test instrument incorrectly determines whether the sample addition amount is sufficient due to the occurrence of the concave liquid surface. Use of the way of designing the fill detection electrode shown in FIG. 7 is very likely to result in that the test instrument incorrectly determines whether the sample addition amount is sufficient. From the further test results in FIGS. 3b, 3c and 3d and FIGS. 5b, 5c and 5d, it can be seen that both the biosensors in FIG. 1 and FIG. 7 can determine that the sample addition amount is insufficient when the sample addition amount is very small and cannot meet the sample addition amount requirement at all; when the sample addition amount is slightly insufficient, the case of a concave liquid surface sometimes appears at the front end of the liquid surface of the sample in the sample supply channel, and in this case, the biosensor in FIG. 1 can still accurately determine that the sample addition amount is insufficient, while the biosensor in FIG. 7 will incorrectly determine that the sample addition amount is sufficient; and when the sample addition amount is sufficient, both the biosensors in FIG. 1 and FIG. 7 can determine that the sample addition amount is sufficient.

On the other hand, the fill detection electrode described in the present invention can also play a role in auxiliary positioning when the interlayer is assembled. For example, in the step of assembling the interlayer 108 when manufacturing the biosensor, as long as the inner side wall of the interlayer 108 is not in contact with the two ends of the fill detection electrode described in the present invention, it can ensure that the interlayer 108 is assembled in the correct position and the scrap rate can be reduced during production of products.

The fill detection electrode may have a "-" (linear) or "T" shape. It can also be the shapes shown in FIGS. 8a, 8b, 8c, 8d, 8e, and 8f, which are variant designs on the basis of FIG. 1, such as the convex belly shape in FIG. 8a, the oval shape in FIG. 8b, the round shape in FIG. 8c, the wavy line in FIG. 8d, the inverted "T" shape in FIG. 8e, and the inclined shape in FIG. 8f. The fill detection electrodes in FIGS. 8a to 8d and FIG. 8f are not in contact with the lateral side of the sample supply channel as the fill detection electrode shown in FIG. 1. The ends of both sides of the head of the fill detection electrode in FIG. 8e close to the sample supply port are not in contact with the two sides of the sample supply channel, and the tail of this electrode away from the sample supply port is in contact with both sides of the sample supply channel. The two ends of the fill detection electrode have a certain distance from both sides of the sample supply channel, and the distance meets the condition that the working electrode and/or the counter electrode is already covered by the sample when the sample contacts the fill detection electrode in the case where the added sample reaches the sample addition amount required by the biosensor.

In a preferred example, the fill detection electrode as shown in FIG. 1 is designed in a "T" shape, and for the fill detection electrode, the end 1021 of "I" of the T shape is connected to a wire 105. Such design can not only avoid the impact of overprinting deviation during the production of test strips when the design of the fill detection electrode is designed too narrow, but also reduce the production cost.

The working electrode, the counter electrode, and the fill detection electrode may also be referred to as an electrode system, and the biosensor 100 shown in FIGS. 1 and 2 further includes an insulating layer 106 disposed on the electrode system. A reagent layer 107 covers at least the working electrode. An interlayer 108 is disposed between the insulating layer 106 and a cover layer 110, and grooves 109 and 106' are formed at positions at the front ends of the interlayer and the insulating layer corresponding to the electrode system, respectively, and said grooves together with the cover layer 110 and the insulating substrate 101 form the sample supply channel 112, in which the working electrode, the counter electrode and the fill detection electrode are exposed. The cover layer is provided with a vent hole 111, and when the sample enters through the sample supply port of the sample supply channel, the gas in the sample supply channel is discharged through the vent hole, so that the detection sample automatically enters the sample supply channel by capillary-siphon action. One end of the wire 105 on the insulating substrate 101 is connected to the electrode, and the other end of the wire 105 is connected to the contact pin in the test instrument. The wire 105' has the function of powering on the instrument and identifying a test strip.

The material of the insulating substrate 101 can be polystyrene, polycarbonate, polyvinyl chloride resin and polyester and other substances. The insulating substrate provides support for the electrodes and electrode wires.

Figure 9:
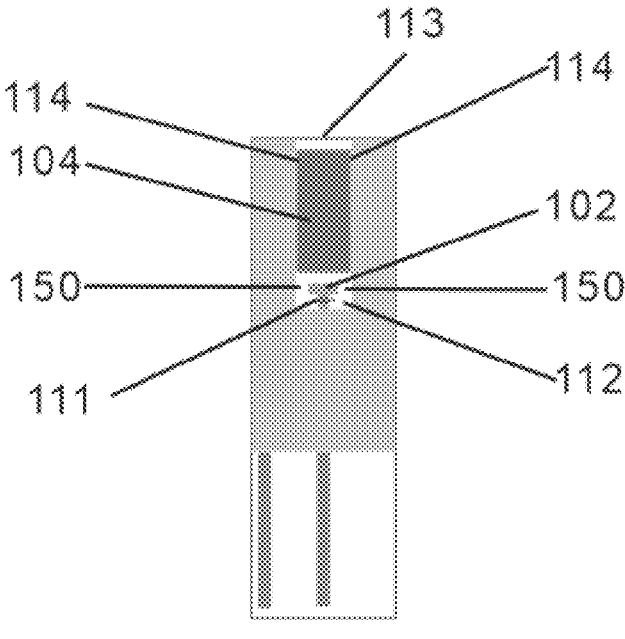
FIG. 9 is a schematic diagram of another biosensor of the present invention, which includes a working electrode and a fill detection electrode having the function of a counter electrode.

The electrodes and the wires can be disposed on the insulating substrate by screen printing or laser engraving, etc. They can use silver or silver chloride, carbon, graphite, palladium, gold, platinum, iridium stainless steel and other suitable conductive materials. The electrodes can also be made from a combination of these materials. For example, the electrodes are made of graphite material and the wires are made of silver material. Said electrode system is a three-electrode system, or may be a two-electrode system, wherein one is the working electrode, and one is the counter electrode, which may also act as the fill detection electrode. The material of the counter electrode can be Ag/AgCl and other materials, but is not limited to these materials. The biosensor as shown in FIG. 9 includes a working electrode 104 and a fill detection electrode 102, and said fill detection electrode also has the function of the counter electrode. A certain spacing distance between the ends of both sides of the fill detection electrode and the two inner side walls of the sample supply channel meets that: in the case where the added sample amount is the sample addition amount required by said biosensor, the working electrode in the sample supply channel is already completely covered by the sample when the sample in the sample supply channel contacts the fill detection electrode.

Figure 10:
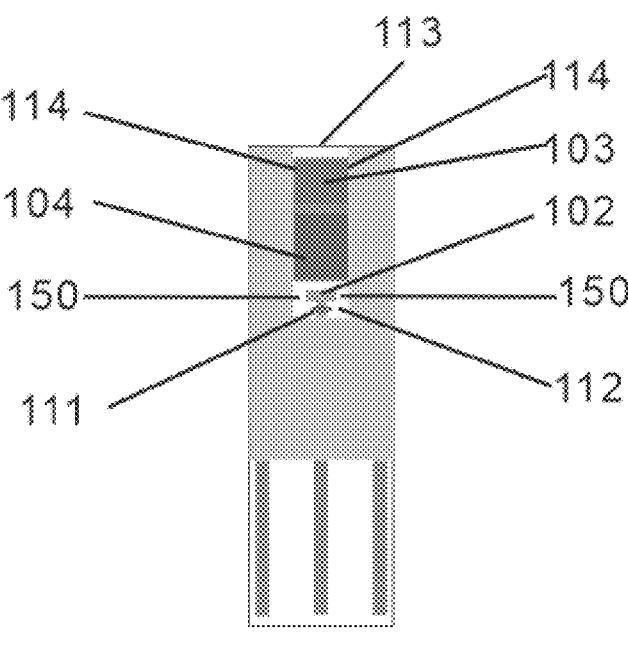
FIG. 10 is another biosensor of the present invention, with the working electrode of said biosensor being located between the counter electrode and the fill detection electrode.

In some other design solutions, the order of the working electrode and the counter electrode of the biosensor described in the present invention is interchangeable. If the working electrode 104 and counter electrode 103 are interchanged in the present invention, the biosensor shown in FIG. 10, for example, includes the working electrode 104, the counter electrode 103 and the fill detection electrode 102, the counter electrode is closest to the sample supply port, the fill detection electrode is farthest from the sample supply port, and the working electrode is disposed between the counter electrode and the fill detection electrode.

The material of the interlayer 108 can be a hydrophilic binder material, which can be an adhesive tape with or without a substrate, and then bonded after processing; or it can be a glue or polymer slurry, which is printed by screen printing.

The insulating layer 106 is made of an insulating material. In the biosensor, the insulating layer 106 is a non-essential element, and in some designs, the biosensor may not include an insulating layer. If the electrodes are not separated by an insulating layer, the material of the interlayer adopts an insulating material.

The inner side of the groove 109 of the interlayer 108 forming the sample supply channel is made of a hydrophilic material or treated with a hydrophilic material, and the side of the cover layer 110 facing the sample supply channel is made of a hydrophilic material or treated with a hydrophilic material. When a blood sample flows in this sample supply channel, the sample solution diffuses faster than the middle sample at the contact end of the hydrophilic lateral side of the sample supply channel, sometimes resulting in the formation of a concave liquid surface at the front edge of the sample. When the sample with a concave liquid surface formed diffuses along the sample supply channel, the liquid surface at the two ends of the front edge of the sample contacts the extended line of the fill detection electrode earlier than the liquid surface in the middle of the sample.

In one design solution, the reagent layer 107 is added to the working electrode, but it can also be added to the counter electrode at the same time, with no reagent layer covering the fill detection electrode. The reagent layer contains one or more chemical components used to detect the presence or absence of an analyte or its content in the liquid sample. For example, the reagent layer includes an oxidoreductase and an electron acceptor, both of which are used to detect the sample and produce a reaction product measurable by an electronic detection system. A specific embodiment is that the target analyte detected by the biosensor is uric acid in blood. The reaction reagent layer includes chemical reagents such as buffer solutions, polymers, and mediators. The reagents may also include a binder. The binder is hydroxyethylcellulose (HEC), which is hydrophilic and can be used to mix with an introduced blood sample, allowing establishment of an electrochemical cell within a few seconds. Other materials can also be used as the binder, such as hydroxymethyl cellulose and hydroxypropyl cellulose. The reaction reagent layer may also include a stabilizer. The reaction layer may also contain mediators, surfactants, polymers, and other reagents that are conducive to carrying out the detection.

The present invention is designed to be a biosensor for detecting blood glucose, uric acid, hemoglobin (Hb), cholesterol, lipoproteins, creatinine, or urea or the like in biological samples.

The cover layer 110 can be made of a PET material, preferably a transparent hydrophilic material. The transparent window can better reflect the state of the sample entering the sample supply channel, and the hydrophilic material can lead to smoother sample supply.

The test instrument is provided therein with contact pins in electrical contact with different wires of the biosensor, and the electrical circuit is formed among the contact pins, wires and at least two different electrodes, and the test instrument measures the electrical signal of the electrical circuit.

The fill detection electrode described in the present invention is used to determine whether the sample added to the biosensor is sufficient and whether the sample reaches the sample addition amount required by the biosensor, according to whether the test instrument can detect whether an electrical signal is generated between the fill detection electrode and another electrode paired with this electrode, or whether this generated electrical signal is greater than a set value which is preset. When the generated electrical signal is greater than the set value, the instrument determines that the added sample amount is sufficient. When no electrical signal is generated or the electrical signal is greater or less than the set value, the instrument determines that the added sample amount is insufficient.

A method for analyzing an analyte in a sample by a biosensor described in the present invention, comprises the following steps:

Step 1: the biosensor is inserted into a test instrument, and the test instrument is triggered to power on after the wires of the biosensor contact the contact pins inside the instrument.

Step 2: the test instrument enters the self-test process.

Step 3: after the instrument displays a sample addition identifier, the operator is prompted to add the sample to the biosensor.

Step 4: the operator adds the sample to the sample supply port of the biosensor and starts a sample addition test.

Step 5: the test instrument applies a DC (direct current) voltage or an AC (alternating current) voltage with small amplitude between the working electrode and the counter electrode to obtain a current signal 1.

Step 6: the working electrode and the counter electrode are disconnected, and the test instrument applies a DC (direct current) voltage or an AC (alternating current) voltage with small amplitude between the working electrode and the fill detection electrode, and circle detection is performed within a specified time to obtain a current signal 2.

If the obtained current signal 2 is greater than the set value within the specified time, the test instrument determines that the sample addition amount is sufficient.

If no current signal 2 greater than the set value is obtained within the specified time, the test instrument determines that the sample addition amount is insufficient.

Said specified time is within 0 to 5 s.

Step 7: if the sample addition amount is sufficient, the test instrument obtains the test result of the analyte according to the current signal 1. If the sample addition amount is insufficient, the test instrument gives a message that the sample addition amount is insufficient, and the detection ends.

Steps 1 to 3 are non-essential steps, and they can be set or not set by the test instrument according to actual situations. Steps 5 and 6 are interchangeable, i.e., step 5 is operated after step 6. In step 5, if the fill detection electrode of the electrode system of the biosensor serves the function of determining whether the sample addition amount is sufficient when determining whether the sample addition amount is sufficient, and serves the function of the counter electrode when measuring the analyte in the sample. The counter electrode in step 5 is replaced with the fill detection electrode.

The set value used for determination can be predetermined by experimental testing.

Example 1 Experiment on Error Reporting Accuracy of Biosensor for Insufficient Sample Addition Amount A biosensor for measuring the content of uric acid in blood, used the structure of the biosensor shown in FIGS. 1 and 2. The fill detection electrode was not in contact with both sides of the sample supply channel, the length of the working electrode was 3.2 mm, the length of the counter electrode was 2.2 mm, the fill detection electrode had a width (L3) of 1.6 mm and a length of 0.6 mm, the width of the sample supply channel was 2.3 mm, the spacing distance between the two ends of the fill detection electrode and the inner side of the sample supply channel was 0.35 mm, and the spacing distance between the counter electrode and the fill detection electrode was 0.65 mm. The reagents on the working electrode and counter electrode included buffer solutions, polymers, mediators and other reagents. The test instrument applied a 0.4V DC voltage between the working electrode and the fill detection electrode, and a current signal 2 was obtained from the fill detection electrode and the working electrode, with the circle test time being 1 second. (The length described in the present invention was the distance in a direction the same as the sample flow direction, and the width was the distance in a direction perpendicular to the sample flow direction. Said sample flow referred to the flow of the sample over the electrodes.)

Different volumes of sample with different hematocrit and different concentrations of a substance to be tested were added to the biosensor shown in FIG. 1 and the biosensor shown in FIG. 7, respectively. The fill detection electrode of the biosensor shown in FIG. 1 was not in contact with both sides of the sample supply channel, and the fill detection electrode of the biosensor shown in FIG. 7 was in contact with both sides of the sample supply channel. 30 samples were tested under each test condition, and error reporting times and the accuracy were calculated respectively. In this experiment, the sample volumes were V1, V2 and V3, where V1 was 2.4 μL, V2 was 2.7 μL and V3 was 3.0 μL, and different volumes of samples were added to the above two biosensors, respectively. When the sample volume was V1, the sample did not completely cover the counter electrode; when the sample volume was V2, the sample basically covered the counter electrode, but did not completely cover the counter electrode; and when the sample volume was V3, the sample completely covered the electrode system, V3 being the sample addition amount required by this biosensor.

Blood samples with 10%, 42% and 70% hematocrit were prepared as the samples to be tested. The sample statuses in the sample supply channel were shown in FIGS. 4 and 6.

Blood samples with different hematocrit were added, and the experimental results about sample supply were shown in Table 2 and Table 3, respectively. The experimental results indicated that (1) when the sample volume was V1, both the biosensor in FIG. 1 and the biosensor in FIG. 7 would obtain an accurate message that the sample addition amount was insufficient because the solution did not reach the third electrode. (2) When the sample volume was V2, in the test of the biosensor in FIG. 7, because the front end of the sample with a concave liquid surface formed would contact the fill detection electrode in contact with the sample supply channel, the two ends of the solution would diffuse along the hydrophilic interlayer when the sample was added, and the diffusion speed at the two ends was faster than that in the middle, the solution in the sample supply channel reached the fill detection electrode at first and generated a current, so that the instrument did not obtain the message that the sample addition amount was insufficient, but the sample supply channel was not filled with the sample actually; while in the test of the biosensor in FIG. 1, even though a concave liquid surface was formed at the front end of the sample, the biosensor in FIG. 1 still obtained the accurate message that the sample addition amount was insufficient in each test because the sample did not touch the fill detection electrode not in contact with the sample supply channel. (3) When the sample volume was V3, the biosensors in FIG. 1 and FIG. 7 both obtained a message that the sample addition amount was sufficient because the solution already covered the electrode system.

The fill detection electrode designed by the present invention could accurately determine whether the sample addition amount is sufficient, which was not affected by the hematocrit of the sample.

TABLE 2

| Experiment on sample addition amount over electrode shown in FIG. 1 | | | | | | | | |
|---|---|---|---|---|---|---|---|---|
| Hematocrit | 10% | 10% | 10% | 42% | 42% | 42% | 70% | 70% | 70% |
| Concentration of substance to be tested (μmol/L) | 250 | 250 | 250 | 250 | 250 | 250 | 250 | 250 | 250 |
| Sample volume (μl) | V1 | V2 | V3 | V1 | V2 | V3 | V1 | V2 | V3 |
| Number of tests | 30 | 30 | 30 | 30 | 30 | 30 | 30 | 30 | 30 |
| Error reporting times | 30 | 30 | 0 | 30 | 30 | 0 | 30 | 30 | 0 |
| Accuracy rate | 100% | 100% | 100% | 100% | 100% | 100% | 100% | 100% | 100% |
| Hematocrit | 10% | 10% | 10% | 42% | 42% | 42% | 70% | 70% | 70% |
| Concentration of substance to be tested (μmol/L) | 600 | 600 | 600 | 600 | 600 | 600 | 600 | 600 | 600 |
| Sample volume (μl) | V1 | V2 | V3 | V1 | V2 | V3 | V1 | V2 | V3 |
| Number of tests | 30 | 30 | 30 | 30 | 30 | 30 | 30 | 30 | 30 |
| Error reporting times | 30 | 30 | 0 | 30 | 30 | 0 | 30 | 30 | 0 |
| Accuracy rate | 100% | 100% | 100% | 100% | 100% | 100% | 100% | 100% | 100% |
| Hematocrit | 10% | 10% | 10% | 42% | 42% | 42% | 70% | 70% | 70% |
| Concentration of substance to be tested (μmol/L) | 1100 | 1100 | 1100 | 1100 | 1100 | 1100 | 1100 | 1100 | 1100 |

TABLE 2-continued

| Experiment on sample addition amount over electrode shown in FIG. 1 | | | | | | | | |
|---|---|---|---|---|---|---|---|---|
| Sample volume (μl) | V1 | V2 | V3 | V1 | V2 | V3 | V1 | V2 | V3 |
| Number of tests | 30 | 30 | 30 | 30 | 30 | 30 | 30 | 30 | 30 |
| Error reporting times | 30 | 30 | 0 | 30 | 30 | 0 | 30 | 30 | 0 |
| Accuracy rate | 100% | 100% | 100% | 100% | 100% | 100% | 100% | 100% | 100% |
| Total number of tests | 90 | 90 | 90 | 90 | 90 | 90 | 90 | 90 | 90 |
| Total error reporting times | 90 | 90 | 0 | 90 | 90 | 0 | 90 | 90 | 0 |
| Total accuracy rate | 100% | 100% | 100% | 100% | 100% | 100% | 100% | 100% | 100% |

TABLE 3

| Experiment on sample addition amount over electrode shown in FIG. 7 | | | | | | | | |
|---|---|---|---|---|---|---|---|---|
| Hematocrit | 10% | 10% | 10% | 42% | 42% | 42% | 70% | 70% | 70% |
| Concentration of substance to be tested (umol/L) | 250 | 250 | 250 | 250 | 250 | 250 | 250 | 250 | 250 |
| Sample volume (pl) | V1 | V2 | V3 | V1 | V2 | V3 | V1 | V2 | V3 |
| Number of tests | 30 | 30 | 30 | 30 | 30 | 30 | 30 | 30 | 30 |
| Error reporting times | 30 | 0 | 0 | 30 | 0 | 0 | 30 | 0 | 0 |
| Accuracy rate | 100% | 0% | 100% | 100% | 0% | 100% | 100% | 0% | 100% |
| Hematocrit | 10% | 10% | 10% | 10% | 10% | 10% | 10% | 10% | 10% |
| Concentration of substance to be tested (μmol/L) | 600 | 600 | 600 | 600 | 600 | 600 | 600 | 600 | 600 |
| Sample volume (μl) | V1 | V2 | V3 | V1 | V2 | V3 | V1 | V2 | V3 |
| Number of tests | 30 | 30 | 30 | 30 | 30 | 30 | 30 | 30 | 30 |
| Error reporting times | 30 | 0 | 0 | 30 | 0 | 0 | 30 | 0 | 0 |
| Accuracy rate | 100% | 0% | 100% | 100% | 0% | 100% | 100% | 0% | 100% |
| Hematocrit | 10% | 10% | 10% | 42% | 42% | 42% | 70% | 70% | 70% |
| Concentration of substance to be tested (μmol/L) | 1100 | 1100 | 1100 | 1100 | 1100 | 1100 | 1100 | 1100 | 1100 |
| Sample volume (μl) | V1 | V2 | V3 | V1 | V2 | V3 | V1 | V2 | V3 |
| Number of tests | 30 | 30 | 30 | 30 | 30 | 30 | 30 | 30 | 30 |
| Error reporting times | 30 | 0 | 0 | 30 | 0 | 0 | 30 | 0 | 0 |
| Accuracy rate | 100% | 0% | 100% | 100% | 0% | 100% | 100% | 0% | 100% |
| Total number of tests | 90 | 90 | 90 | 90 | 90 | 90 | 90 | 90 | 90 |
| Total error reporting times | 90 | 0 | 0 | 90 | 0 | 0 | 90 | 0 | 0 |
| Total accuracy rate | 100% | 0% | 100% | 100% | 0% | 100% | 100% | 0% | 100% |

(Note: This experiment counts the number of errors reporting times by the sample volume V2, which were merely conditions of FIGS. 3c and 4c and FIGS. 5c and 6c formed in the sample supply channel after sample addition)

Example 2 Experiment on Sample Addition
Amounts at Different Temperatures

Temperature also has a relatively significant effect on the rate of the sample entering the sample supply channel. Therefore, in this example, on the basis of Example 1, the biosensor in FIG. 1 and the biosensor in FIG. 7 were tested at different temperatures (2.5° C., 10.0° C., 21.0° C., 40.0° C., and 47.5° C.), samples with different hematocrit (10%, 42%, and 70%) were added to the sample supply channel of a test strip in a sample addition amount V2, i.e., 2.7 µL, and 100 times of tests were carried out under each test condition.

The experimental results were shown in Table 4 and Table 5 below. The experiments showed that the test accuracy of the biosensor in FIG. 1 was significantly higher than that of the biosensor in FIG. 7 at different temperatures. Even at different temperatures, the fill detection electrode not in contact with the sample supply channel also could greatly avoid the risk that the instrument made an incorrect determination due to insufficient sample amount.

Example 3 Experiment on Test Accuracy

The biosensor shown in FIG. 1 was used to carry out the experiment on test accuracy.

Blood samples, the uric acid concentrations of which were 250 µmol/L, 500 µmol/L, 700 µmol/L and 1050 µmol/L respectively, were added to the biosensor shown in FIG. 1 of the present invention at ambient temperatures 7.5° C., 21° C. and 42.5° C. for detection, and the sample addition amount was 3.0 µl as required by this test strip, with the results shown in Table 6 below. The experiment indicated that the biosensor of the present invention had a small deviation from Mindray BS-350E fully automated biochemical test instrument in various concentration segments of uric acid tests, and has good test stability.

TABLE 4

Experiment on sample addition amount over electrode shown in FIG. 1

| Hematocrit | 10% | 10% | 10% | 10% | 10% | 42% | 42% | 42% | 42% | 42% | 70% | 70% | 70% | 70% | 70% |
|---|---|---|---|---|---|---|---|---|---|---|---|---|---|---|---|
| Concentration of substance to be tested (µmol/L) | 200 | 200 | 200 | 200 | 200 | 200 | 200 | 200 | 200 | 200 | 200 | 200 | 200 | 200 | 200 |
| Temperature of test environment (° C.) | 2.5 | 10.0 | 21.0 | 40.0 | 147.5 | 2.5 | 10.0 | 21.0 | 40.0 | 47.5 | 2.5 | 10.0 | 21.0 | 40.0 | 47.5 |
| Sample volume (µl) | V2 | V2 | V2 | V2 | V2 | V2 | V2 | V2 | V2 | V2 | V2 | V2 | V2 | V2 | V2 |
| Number of tests | 100 | 100 | 100 | 100 | 100 | 100 | 100 | 100 | 100 | 100 | 100 | 100 | 100 | 100 | 100 |
| Error reporting times | 100 | 100 | 100 | 100 | 100 | 100 | 100 | 100 | 100 | 100 | 100 | 100 | 100 | 100 | 100 |
| Accuracy rate | 100% | 100% | 100% | 100% | 100% | 100% | 100% | 100% | 100% | 100% | 100% | 100% | 100% | 100% | 100% |

TABLE 5

Experiment on sample addition amount over electrode shown in FIG. 7

| Hematocrit | 10% | 10% | 10%l | 10% | 10% | 42% | 42% | 42% | 42% | 42% | 70% | 70% | 70% | 70% | 70% |
|---|---|---|---|---|---|---|---|---|---|---|---|---|---|---|---|
| Concentration of substance to be tested (µmol/L) | 200 | 200 | 200 | 200 | 200 | 200 | 200 | 200 | 200 | 200 | 200 | 200 | 200 | 200 | 200 |
| Temperature of test environment (° C.) | 2.5 | 10.0 | 21.0 | 40.0 | 47.5 | 2.5 | 10.0 | 21.0 | 40.0 | 47.5 | 2.5 | 10.0 | 21.0 | 40.0 | 47.5 |
| Sample volume (µl) | V2 | V2 | V2 | V2 | V2 | V2 | V2 | V2 | V2 | V2 | V2 | V2 | V2 | V2 | V2 |
| Number of tests | 100 | 1100 | 100 | 100 | 100 | 100 | 100 | 100 | 100 | 100 | 100 | 100 | 100 | 100 | 100 |
| Error reporting times | 0 | 0 | 0 | 0 | 0 | 0 | 0 | 0 | 0 | 0 | 0 | 0 | 0 | 0 | 0 |
| Accuracy rate | 0% | 0% | 0% | 0% | 0% | 0% | 0% | 0% | 0% | 0% | 0% | 0% | 0% | 0% | 0% |

(Note: This experiment counts the number of errors reporting times by the sample volume V2, which were merely conditions of FIGS 3c and 4c and FIGS. 5c and 6c formed in the sample supply channel after sample addition)

TABLE 6

| | | | | | | | | | | | | |
|---|---|---|---|---|---|---|---|---|---|---|---|---|
| Experiment on test accuracy of urine acid | | | | | | | | | | | | |
| Test value-1 of biochemical analyzer (μmol/L) | 232 | 523 | 706 | 1068 | 232 | 523 | 706 | 1068 | 232 | 523 | 706 | 1068 |
| Test value-2 of biochemical analyzer (μmol/L) | 236 | 519 | 705 | 1057 | 236 | 519 | 705 | 1057 | 236 | 519 | 705 | 1057 |
| Average test value of biochemical analyzer (μmol/L) | 234.0 | 521.0 | 705.5 | 1062.5 | 234.0 | 521.0 | 705.5 | 1062.5 | 234.0 | 521.0 | 705.5 | 1062.5 |
| Temperature of test environment | 7.5° C. | 7.5° C. | 7.5° C. | 7.5° C. | 21° C. | 21°C | 21° C. | 21° C. | 42.5° C. | 42.5° C. | 42.5° C. | 42.5° C. |
| Reading of test instrument (μmol/L) | | | | | | | | | | | | |
| Test value 1 | 222 | 481 | 718 | 1037 | 229 | 515 | 711 | 1057 | 213 | 510 | 758 | 1087 |
| Test value 2 | 246 | 490 | 702 | 1028 | 265 | 494 | 717 | 1074 | 238 | 516 | 754 | 1097 |
| Test value 3 | 226 | 489 | 706 | 1057 | 223 | 494 | 698 | 1045 | 223 | 558 | 774 | 1100 |
| Test value 4 | 210 | 484 | 696 | 1000 | 233 | 516 | 719 | 1029 | 187 | 556 | 732 | 1082 |
| Test value 5 | 222 | 511 | 682 | 1006 | 234 | 509 | 698 | 1048 | 217 | 504 | 749 | 1080 |
| Test value 6 | 246 | 499 | 709 | 1028 | 246 | 513 | 712 | 1046 | 219 | 498 | 752 | 1095 |
| Test value 7 | 229 | 502 | 708 | 1006 | 233 | 519 | 693 | 1006 | 226 | 561 | 741 | 1054 |
| Test value 8 | 221 | 488 | 729 | 1027 | 230 | 500 | 682 | 1017 | 210 | 520 | 753 | 1041 |
| Test value 9 | 202 | 508 | 695 | 1025 | 215 | 495 | 705 | 1018 | 184 | 545 | 740 | 1050 |
| Test value 10 | 218 | 498 | 686 | 1023 | 194 | 489 | 696 | 1040 | 192 | 525 | 741 | 1056 |
| Test value 11 | 201 | 482 | 706 | 1017 | 221 | 526 | 708 | 1034 | 198 | 520 | 733 | 1077 |
| Test value 12 | 220 | 489 | 727 | 1014 | 223 | 493 | 699 | 1041 | 234 | 531 | 736 | 1055 |
| Test value 13 | 211 | 507 | 705 | 1004 | 218 | 485 | 691 | 1037 | 227 | 525 | 732 | 1036 |
| Test value 14 | 226 | 491 | 721 | 999 | 232 | 519 | 701 | 1028 | 197 | 492 | 742 | 1068 |
| Test value 15 | 200 | 502 | 720 | 1005 | 222 | 521 | 726 | 1039 | 216 | 520 | 747 | 1059 |
| Test value 16 | 218 | 504 | 671 | 1012 | 237 | 478 | 697 | 1030 | 168 | 528 | 743 | 1067 |
| Test value 17 | 224 | 502 | 694 | 1023 | 272 | 488 | 717 | 1010 | 195 | 490 | 746 | 1067 |
| Test value 18 | 218 | 515 | 711 | 992 | 223 | 497 | 685 | 1021 | 215 | 509 | 744 | 1104 |
| Test value 19 | 235 | 512 | 715 | 1042 | 206 | 499 | 714 | 1033 | 218 | 509 | 740 | 1050 |
| Test value 20 | 225 | 510 | 725 | 1027 | 222 | 503 | 681 | 1016 | 211 | 525 | 728 | 1096 |
| Average test value | 221.0 | 498.2 | 706.3 | 1018.6 | 228.9 | 502.7 | 702.5 | 1033.5 | 209.4 | 522.1 | 744.3 | 1071.1 |
| SD | 12.64 | 10.71 | 15.55 | 16.19 | 17.63 | 13.70 | 12.80 | 16.51 | 18.01 | 20.52 | 10.67 | 20.85 |
| CV | 5.7% | 2.1% | 2.2% | 1.6% | 7.7% | 2.7% | 1.8% | 1.6% | 8.6% | 3.9% | 1.4% | 1.9% |
| Deviation from test value of biochemical analyzer (%) | −13.0 | −4.4% | 0.1% | −4.1% | −5.1 | −3.5% | −0.4% | −2.7% | −24.6 | 0.2% | 5.5% | 0.8% |

The invention claimed is:

1. A biosensor comprising:

an insulating substrate, an axial sample supply channel comprising a proximal end at a first end of the insulating substrate, a distal end, a pair of opposed lateral side walls, and a sample supply port at the proximal end, wherein the sample supply channel is configured and arranged such that a sample applied to the sample supply port flows by capillary force along a flow axis from the proximal end towards the distal end, a working electrode disposed on the insulating substrate and in fluid communication with the sample supply channel, a fill detection electrode disposed on the insulating substrate and in fluid communication with the sample supply channel wherein the fill detection electrode, wherein the fill detection electrode comprises a head region and a tail region, wherein the head region extends further laterally within the sample supply channel relative to the tail region, and wherein the head region is proximal to the sample supply port relative to the tail region, and a reagent layer covering at least the working electrode, wherein said fill detection electrode distal from the sample supply port of the sample supply channel relative to the working electrode, wherein L3 is lateral width of the head region of the fill detection electrode, wherein $L_3$ is defined by the equation $L_3=L_1-L_2*2$ or $L_3=L_1-L_2*1.5*2$, wherein L1 is the distance between the pair of side walls of the sample supply channel and L2 is a gap provided between the head region of the fill detection electrode and the pair of side walls of the sample supply channel such that the head region does not contact the pair of side walls.

2. The biosensor according to claim 1, wherein the fill detection electrode further comprises an intermediate region between the head region and the tail region that is in contact with the pair of side walls of the sample supply channel.

3. The biosensor according to claim 1, wherein the biosensor further comprises a counter electrode, wherein the fill detection electrode is separate from the counter electrode.

4. The biosensor according to claim 3, wherein the fill detection electrode is distal to the sample supply port of the sample supply channel relative to the counter electrode.

5. The biosensor according to claim 4, wherein the working electrode is closest to the sample supply port, and the counter electrode is disposed between the working electrode and the fill detection electrode.

6. The biosensor according to claim 4, wherein the counter electrode is closest to the sample supply port, and the working electrode is disposed between the counter electrode and the fill detection electrode.

7. The biosensor according to claim 1, wherein the width of the sample supply channel ranges from 2 mm to 4 mm, and the width of the fill detection electrode ranges from 1 mm to 1.8 mm.

8. The biosensor according to one of claims claim 1, wherein the biosensor further comprises an insulating layer and a cover layer, the cover layer being provided with a vent hole, and an interlayer being disposed between the insulating layer and the cover layer.

9. The biosensor according to one of claims claim 1, wherein said fill detection electrode has the function of the counter electrode.

10. The biosensor according to claim 1, wherein said biosensor is configured and arranged to detect uric acid, blood glucose, cholesterol, lipoproteins, hemoglobin, creatinine or urea in a biological sample.

11. The biosensor according to claim 2, wherein the biosensor further comprises a counter electrode, wherein the fill detection electrode is separate from the counter electrode.

12. The biosensor according to claim 11, wherein the fill detection electrode is further away from the sample supply port of the sample supply channel than the working electrode and the counter electrode.

13. The biosensor according to claim 12, wherein the working electrode is closest to the sample supply port, and the counter electrode is disposed between the working electrode and the fill detection electrode; or wherein the counter electrode is closest to the sample supply port, and the working electrode is disposed between the counter electrode and the fill detection electrode.

\* \* \* \* \*